Aug. 11, 1970       H. HARTMANN       3,524,126
TRANSFORMER FOR TRANSMITTING PULSES OR POWER
AT STEPPED HIGH-VOLTAGE POTENTIAL
Filed April 1, 1968       3 Sheets-Sheet 1

INVENTOR
HANS HARTMANN,

BY Pierre, Scheffler & Parker
ATTORNEYS

INVENTOR
HANS HARTMANN,

BY Pierce, Scheffler & Parker
ATTORNEYS

Aug. 11, 1970

H. HARTMANN 3,524,126

TRANSFORMER FOR TRANSMITTING PULSES OR POWER
AT STEPPED HIGH-VOLTAGE POTENTIAL

Filed April 1, 1968

INVENTOR
HANS HARTMANN,

BY *Pierce, Scheffler & Parker*
ATTORNEYS

United States Patent Office 3,524,126
Patented Aug. 11, 1970

3,524,126
TRANSFORMER FOR TRANSMITTING PULSES OR POWER AT STEPPED HIGH-VOLTAGE POTENTIAL
Hans Hartmann, Ennetbaden, Switzerland, assignor to Aktiengesellschaft Brown, Boveri & Cie, Baden, Switzerland, a joint-stock company
Filed Apr. 1, 1968, Ser. No. 717,659
Claims priority, application Switzerland, Apr. 21 1967, 5,756/67
Int. Cl. G05f 5/00; H01f 15/14, 31/04
U.S. Cl. 323—61                              7 Claims

ABSTRACT OF THE DISCLOSURE

An electrical transformer comprises an inverted U-shaped insulative tube, a loop-shaped primary winding passed through the tube, and a plurality of annular secondary units mounted upon the limbs of the U-tube, each secondary unit comprising an annular core on which a secondary winding is wound. These transformer components are housed within a container filled with an insulating medium or the components may be cast within a block of synthetic resin material. Also, potential control capacitors are connected between the windings of adjacent secondary units.

---

The present invention relates to an improved transformer construction for transmitting impulses, or power at graduated different high voltages. Such transformers are required in installations supplying active electrical elements connected in cascade, i.e. in series, examples of which are rectifiers, thyristors, or semiconductor elements and their accessories, which are used in providing high voltage direct-current transmission.

A conventional transformer provided with a single secondary winding which is tapped at various points along the turns is not normally suitable for this purpose since the high-voltage potentials of the individual stages defined between the tapping points are in a fixed relationship to each other. Also, at each stage, only a portion of the turns of the secondary winding is utilized. Although a transformer with a plurality of individually wound secondary coils—not electrically interconnected with each other in a galvanic manner—and applied to an iron core common to all of the secondary coils would enable the tapping potentials to be matched to the high voltage stages, the inductance of such an arrangement would be undesirably great so that, for example, the slope of the voltage pulse transmitted from the transformer would be considerably reduced. A further disadvantage of such a construction is that the high potential secondary windings have to be safely insulated from the primary winding and from the common transformer core which is earthed. Having in mind that a transformer structure of this type having a plurality of secondary coils which are not electrically connected with one another may be of considerable diameter, the capital outlay necessary to provide the required insulation would be quite high.

The principal object of the present invention is to provide an improved transformer construction to serve the purpose indicated above in supplying impulses or power at high voltages from its secondary side but which avoids the disadvantages of constructions previously known to the art.

In accordance with the invention, the improved transformer construction includes a loop-shaped primary winding which passes through an insulative tube on which are mounted a plurality of encircling iron cores, there being at least one toroidal secondary winding wound upon each core. Each secondary winding provides a high-voltage output stage and requires only a relatively small number of turns since this is not a decisive factor in the secondary potentials which possibly may be high.

A transformer in accordance with the invention can have a significantly smaller inductance than known arrangements using separate secondary coils wound on a common iron core. Also, there is a saving in insulation and thereby in the weight and size of the transformer.

Advantageously the cores are electrically connected to the secondary windings wound on them. Each secondary winding requires to be insulated from the adjacent windings by a layer of insulative material wound around it or by the use of suitable insulative caps and sleeves or insulating flanges which effectively enclose individual secondary windings. The insulation required between adjacent toroidal secondary windings need only be dimensioned to withstand the difference in potential between the voltages of the secondary windings.

The thickness of the insulative tube must be such that it is able to withstand the voltage difference between the primary winding of the transformer and the secondary windings. Preferably, the tube is of U-shape, suitably inverted, and conveniently the secondary windings having diminishing potentials are disposed progressively nearer the free ends of the U. Since with such an arrangement the voltage which the insulative tube must withstand is least at the open end of the U, the tube thickness may be progressively diminished towards the open end. This is a particularly suitable arrangement when the secondary winding having the lowest potential is earthed, i.e. grounded.

The secondary winding with the lowest potential can have a considerably different voltage with respect to earth or to the voltage of the primary winding. This may occur, for example, when several transformers are cascaded in series electrically. In such case, it is advantageous for the free ends of the limbs of the inverted, U-shaped insulative tube to carry additional insulation in the form of radially extending insulative flanges which are disposed between the secondary windings nearest the free ends of the limbs and the primary winding and earthed parts of the transformer and its enclosure.

The improved transformer components consisting of insulative U-tube, primary winding, and secondary windings and their individual cores, can be enclosed within a container which preferably is formed at least in part by electrically insulative material. Terminal connections for the secondary windings to the outside may then be passed through the insulative portion of the container wall. The container is suitably filled with insulating oil, or gas. As an alternative, the transformer components may be cast within a block of suitable synthetic resin material thus eliminating the need for utilizing a separate container element.

The invention will now be described in more detail with respect to various embodiments thereof, and with reference to the accompanying drawings which illustrate them. In the drawings.

Figure 1:
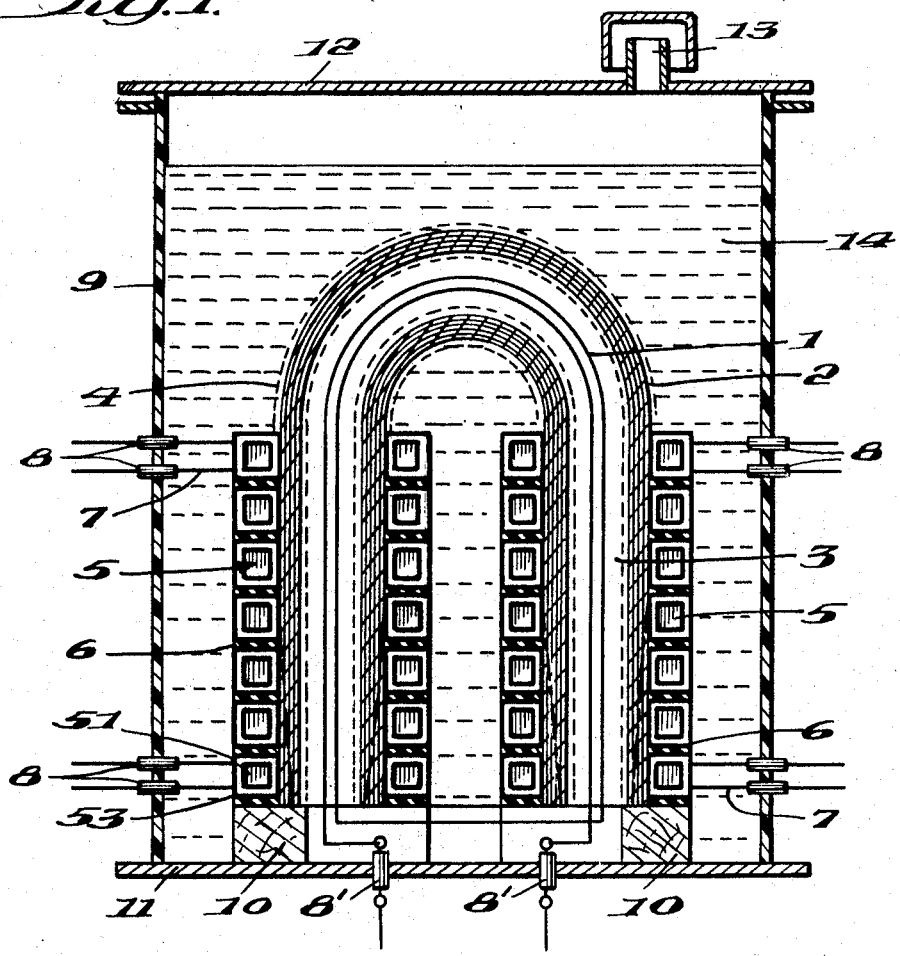
FIG. 1 is a vertical section through one embodiment of the invention where the transformer components are housed within the oil-filled container.
Figure 2:
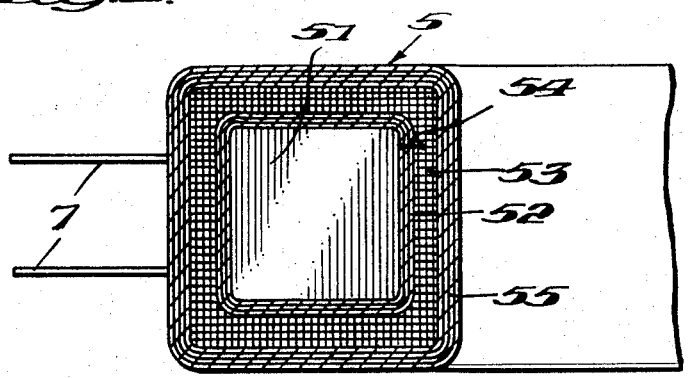
FIG. 2 is an enlarged detail of the portion in FIG. 1 enclosed within the dash-dot circle *a*.

With reference now to the drawings and to FIGS. 1 and 2 in particular, the improved transformer construction is seen to include a loop-shaped primary winding 1 which passes through an insulative tube 2 having an inverted U-shape. Both limbs of the tube 2 may have constant wall thickness throughout their entire length, as indicated by the left limb. Alternatively, as a modified construction, both limbs of the tube may be of the same thickness throughout most of their length but have a progressively diminishing thickness towards their free ends disposed at the lower, open end of the U, as is represented in dashed outline in FIG. 1. Tube 2 may be internally and externally shielded electrostatically by means of an internal screen 3 and an external screen 4.

The secondary side of the transformer is formed by a plurality of annular units 5, each comprising an annular iron core 51 encircling a limb of tube 2, and having a secondary winding 53 coiled about it. The secondary winding units 5 consisting of cores and coils are pushed onto the limbs of the tube and intermediate inserts 6 of insulation material are arranged between them for mutual insulation. Each of the secondary windings 53 is separately connected through leads 7 to terminals 8 which pass through an insulative portion of wall 9 of an enclosing container for the transformer components. To simplify the drawings only the connection leads for some of the secondary windings have been included in FIG. 1.

The transformer components are carried by a wooden annular support 10 which rests upon a base plate 11 forming an end wall of the container. The upper end of the container is closed by a cover 12 provided with a vent 13, and is filled with an insulating medium 14 such as transformer oil. The secondary windings positioned at the lowermost part of the U-tube are connected to the lowest stage of the high voltage potential and progressively higher located secondary windings are connected to progressively higher stages of high voltage potential. In the modified construction shown by the right limb of the U-tube, the progressively reduced wall thickness of the lower, open end is sufficient to withstand the potential difference between the lowermost located secondary windings on the tube and the primary winding where they are at approximately the same potential. The ends of the primary winding 1 are taken out through the insulative terminal bushings 8' which pass through the base plate 11.

FIG. 2 is an enlarged cross-section through one of the secondary winding units 5 to better illustrate their construction. Each unit is comprised of an annular iron core 51 surrounded by a thin layer of insulation 52 on which is toroidally wound a secondary winding 53 and which is connected electrically to core 51 by a short conductor 54. An outer layer of insulation 55 is applied to the secondary winding 53 and is so dimensioned that, together with the outer insulation layer on an adjacent winding, it is able to withstand safely the inter-stage voltage which occurs between adjacent high voltage windings. The lead-out conductors from the secondary winding 53 are shown at 7.

Figure 3:
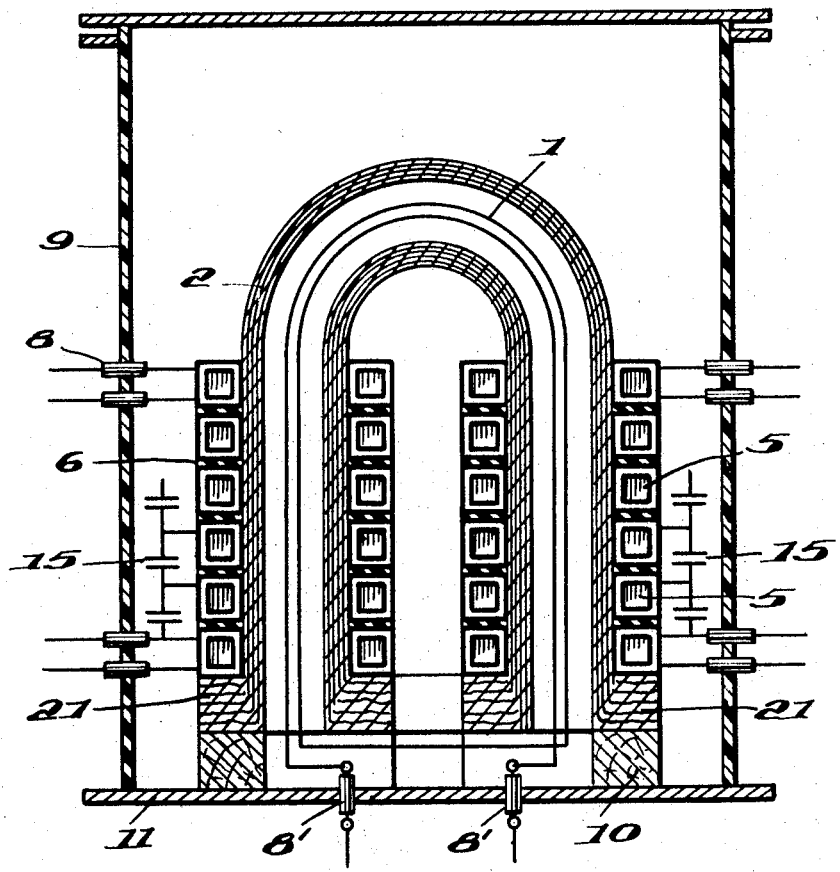
FIG. 3 shows a modified embodiment, generally similar to that illustrated in FIG. 1 but wherein insulating flanges are provided at the open end of the U-tube and potential control capacitors are included.

In the modified transformer structure shown in FIG. 3 it is seen that the open ends of the limbs of the insulative inverted U-shaped tube terminate in radially extending flanges 21. These flanges provide a sufficient thickness of insulation to withstand the rather high degree of voltage differences occurring between the lowermost secondary windings on the limbs and the primary winding as well as the base plate of the container. Control capacitances 15 are shown in FIG. 3 connected between the secondary winding units 5, i.e. between adjacent windings 53, and are provided to control the interstage potentials. FIG. 3 does not show the oil filling and vent but these would be normally present if the transformer components are immersed in oil as is the case in the FIG. 1 embodiment. It will be appreciated that instead of transformer oil, the container 9 may be filled with a suitable insulating gas, in which case the vent would naturally not be included.

Figure 4:
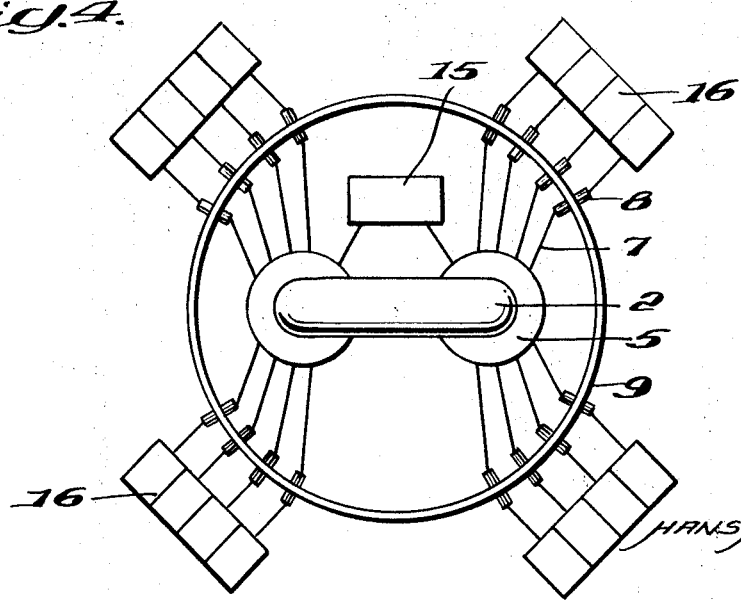
FIG. 4 is a plan view of the transformer construction shown in FIG. 3 in association with rectifier banks located outside of the container and which are fed from the individual secondary windings.

FIG. 4 shows a top plan of the transformer structure in FIG. 3 with the cover plate 12 removed. Electrical leads 7 are shown extending from four banks of semiconductor type rectifiers 16, distributed around the outside of container 9, to the secondary winding units 5 located inside the container. In this arrangement, a stack of capacitors 15 for interstage potential control may be provided inside the container, the capacitor stack being common to the secondary winding units 5 on both limbs of the U-shaped insulative tube 2.

It is advantageous with increasing potentials which occur with cyclic permutation of the rectifier banks in operation of the installation, for terminals 8 to be arranged progressively higher above ground level in accordance with their increasing potentials so that the terminals form a rising helix around the container.

Figure 5:
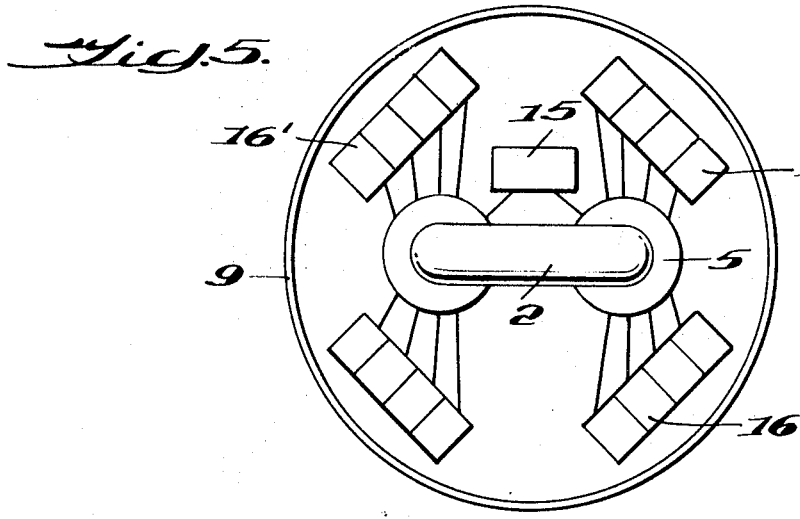
FIG. 5 illustrates an arrangement similar to FIG. 4 but wherein the banks of rectifiers aer located within the transformer container or tank.

As illustrated in FIG. 5, which is similar to FIG. 4, the banks of rectifiers 16' may be located within container 9 and thus immersed in the transformer oil filling which has the advantage of improving the heat transfer from the cooling elements associated with the rectifiers. Such an arrangement has the additional advantage when the container is oil filled that the dielectric strength of the oil, which is much higher than that of air, is utilized with respect to all components carrying high potential and, moreover, enables the semiconductor elements of the rectifier banks to be placed closer together so that one achieves an overall reduction in the dimensions of the installation.

Figure 6:
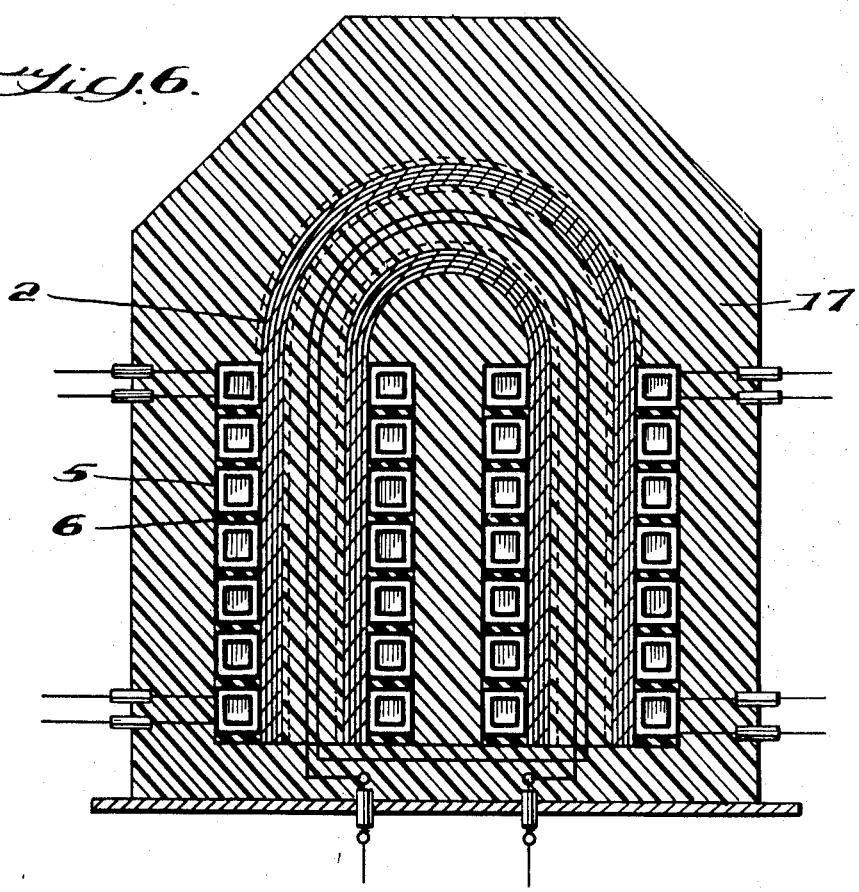
FIG. 6 shows a further modification wherein the operating components of the transformer such as the U-shaped insulative tube, primary winding, and secondary windings and their cores are all cast within a block of synthetic resin material.

It is not necessary to make any significant alterations to the construction of the transformer components if these are to be insulated by being cast in a block of synthetic resin material 17, as illustrated in FIG. 6. The remaining components are in principle the same as shown in FIG. 1. Parts 9, 10, 12 and 13 of the FIG. 1 embodiment are, however, omitted since the functions of these parts are taken over by the resin casting 17.

In conclusion, it will be observed that an advantage of the improved transformer construction derives from the loop-shape of the primary winding 1 and the arrangement of the toroidal secondary winding units 5 encircling the limbs of the U-shaped insulative tube 2. If one examines the secondary winding units, in turn, progressing from one end of the inverted U-tube to the other, it will be seen that one begins with the lowest potential at the lower end of one limb, and returns again to the lowest potential at the other end of the other limb. Thus, a small area encircled by the loop and a correspondingly small inductance is obtained.

I claim:

1. A high-voltage transformer comprising a U-shaped tube of insulating material, the inner and outer surfaces of said tube being provided with electrostatic shielding, a looped-shaped primary winding passed through said U-shaped tube, a plurality of separate secondary units mounted on each of the legs of said U-shaped tube, each said secondary unit comprising an annular core encircling a leg of said tube and a toroidal secondary winding on said core, means electrically connecting each said core to its respective secondary winding, said secondary windings with the lowest potential being located at the open ends of said U-shaped tube, and means providing separate lead-out terminals from each of said secondary windings for connection to separate loads.

2. A high-voltage transformer as defined in claim 1 and which further includes insulating means separating adjacently located secondary windings.

3. A high-voltage transformer as defined in claim 1 wherein said U-shaped insulative tube is inverted.

4. A high-voltage transformer as defined in claim 1 wherein the limbs of said U-shaped insulative tube have a uniform wall thickness.

5. A high-voltage transformer as defined in claim 1 wherein the limbs of said U-shaped insulative tube have a progressively narrowing wall thickness in the direction of the open ends of the U.

6. A high-voltage transformer as defined in claim 1 wherein the open ends of said U-shaped insulative tube are provided with radially extending insulating flanges which insulate the adjacent secondary windings on the limbs of said tube from other parts of the transformer which have electrical potentials different from those on said secondary windings.

7. A high-voltage transformer as defined in claim 1 and which further includes potential control capacitors connected between the windings of adjacent secondary units on said insulative tube.

References Cited

UNITED STATES PATENTS

| | | |
|---|---|---|
| 1,916,588 | 7/1933 | Schrader et al. ____ 336—70 XR |
| 2,153,090 | 4/1939 | Libbe _____ 336—70 XR |
| 2,412,345 | 12/1946 | Lindenblad _____ 336—173 XR |
| 3,200,320 | 8/1965 | Mallory _____ 320—2 |
| 3,225,258 | 12/1965 | Brekoo et al. _____ 336—96 XR |
| 3,274,526 | 9/1966 | Emanuelson _____ 336—70 XR |

FOREIGN PATENTS

| | | |
|---|---|---|
| 54,849 | 3/1958 | Canada. |
| 281,177 | 6/1952 | Germany. |
| 554,901 | 1943 | Great Britain. |
| 742,554 | 12/1955 | Great Britain. |
| 425,778 | 10/1947 | Italy. |

THOMAS J. KOZMA, Primary Examiner

U.S. Cl. X.R.

336—70, 34, 96, 173